United States Patent
Murataj

(10) Patent No.: US 11,937,591 B1
(45) Date of Patent: Mar. 26, 2024

(54) LINE FEEDING MECHANISM FOR INTERLINE FISHING RODS AND RELATED APPARATUS

(71) Applicant: Lissus Murataj, New York, NY (US)

(72) Inventor: Lissus Murataj, New York, NY (US)

( * ) Notice: Subject to any disclaimer, the term of this patent is extended or adjusted under 35 U.S.C. 154(b) by 0 days.

(21) Appl. No.: 17/977,931

(22) Filed: Oct. 31, 2022

(51) Int. Cl.
*A01K 87/04* (2006.01)
*A01K 87/00* (2006.01)
*A01K 97/10* (2006.01)

(52) U.S. Cl.
CPC ............ *A01K 87/04* (2013.01); *A01K 87/002* (2013.01); *A01K 87/005* (2013.01); *A01K 97/10* (2013.01)

(58) Field of Classification Search
CPC .... A01K 87/04; A01K 87/002; A01K 87/005; A01K 87/008; A01K 87/009
See application file for complete search history.

(56) References Cited

U.S. PATENT DOCUMENTS

| | | | | |
|---|---|---|---|---|
| 1,595,275 A | * | 8/1926 | White | A01K 87/002 191/64 |
| 5,299,377 A | * | 4/1994 | Akiba | A01K 87/002 43/18.1 HR |
| 2005/0076555 A1 | * | 4/2005 | Latouche | A01K 87/005 43/18.1 R |
| 2021/0045372 A1 | * | 2/2021 | Gravely | A01K 87/04 |

FOREIGN PATENT DOCUMENTS

FR 980938 A * 5/1951

* cited by examiner

*Primary Examiner* — Christopher R Harmon

(57) ABSTRACT

The present disclosure provides a feeding mechanism for an interline fishing rod which couples to the rear end of the rod body or handle. The feeding mechanism differs from conventional designs by receiving a fishing line from the reel in a direction moving away from the rod tip, the line is then pulled around an internal pulley in the feeding mechanism housing and fed through a channel that is aligned with the central channel of the interline rod when coupled to it. The design protects the fishing line from tangling and damage while facilitating fast and easy assembly of the rod for use. Various accessories and compatible rod designs are also provided.

9 Claims, 7 Drawing Sheets

LINE FEEDING MECHANISM FOR INTERLINE FISHING RODS AND RELATED APPARATUS

FIELD OF INVENTION

The present invention relates generally to fishing rods. More specifically, the present invention relates to a rear line feeding mechanism for an interline fishing rod and related fishing rod designs.

BACKGROUND

Traditional fishing rod designs utilize a flexible shaft with a handle and fishing line reel at one end, and a plurality of rings or eyelets running along the shaft body for guiding the line to the opposing tip. These eyelets expose the line and are a point of weakness both in terms of the fragility of the fishing rod itself and in terms of allowing the line to become tangled or damaged due to their open nature. The process of preparing a traditional fishing rod for use is also arduous due to the requirement to thread the line through each eyelet.

A solution that has been proposed to these problems is the development of interline fishing rods, where the fishing line is run from the reel through the shaft body, emerging at the tip. While these solutions represent a tangible improvement, the process of preparing them for use is often even more arduous, and many designs are overcomplicated and thus expensive.

There is a need for a line feeding mechanism for interline fishing rods which brings their ease of use more in line with traditional fishing rods while maintaining a robust structure. It is within this context that the present invention is provided.

SUMMARY

The present disclosure provides a feeding mechanism for an interline fishing rod which couples to the rear end of the rod body or handle. The feeding mechanism differs from conventional designs by receiving a fishing line from the reel in a direction moving away from the rod tip, the line is then pulled around an internal pulley in the feeding mechanism housing and fed through a channel that is aligned with the central channel of the interline rod when coupled to it. The design protects the fishing line from tangling and damage while facilitating fast and easy assembly of the rod for use. Various accessories and compatible rod designs are also provided.

According to a first aspect of the present disclosure, there is provided a feeding mechanism for an interline fishing rod, the feeding mechanism comprising: a housing having a first end configured to couple to the rear end of an interline fishing rod, the first end having a first opening leading into a first tunnel, the first opening being positioned on the first end such that when the housing is coupled to a fishing rod, the opening aligns with the central axis of the rod body which aligns with the direction of the first tunnel.

The mechanism further comprises a freely rotatable pulley, disposed within the housing, a wheel of the pulley having a V-shaped groove for guiding a fishing line running abouts its edge, the pulley wheel being constrained to rotate about a shaft within the housing such that the axis of rotation of the pulley wheel is orthogonal to the direction of the first channel.

The housing has a second opening formed on its exterior configured to receive a fishing line from a reel, with a second channel leading from the second opening in a direction away from the first end and towards an opposing second end of the housing and into a chamber containing the pulley.

In some embodiments, the housing is modular, comprising a male part with a shaft for the pulley wheel and a female part that couples to the male part and has a corresponding opening for receiving the end of the shaft.

In such embodiments, the base of the shaft of the male part and the opening of the female part may each comprise a ridged lip for constraining the lateral movement of the pulley wheel along the shaft.

Additionally, the male part and the female part may each comprise an integrated magnet in their interiors, positioned such that the magnets exert an attract force between the two parts when assembled.

Furthermore, the interfacing surfaces of the male part and the female part may be flat aside from the pulley chamber and shaft, allowing the male part to be rotated with respect to the female part about the shaft axis when the feeding mechanism is not coupled to the fishing rod.

In some embodiments, the mechanism further comprises a locking and line feeding element configured to secure the first end of the housing to the rear of an interline fishing rod, the element having a cylindrical body with a first end and a second end and a central channel running through its length for feeding line from the first end of the housing to the fishing rod.

In such embodiments, first end of the cylindrical body of the locking and line feeding element may have a guiding indent surrounding the opening of the central channel for receiving a central tip of a telescoping interline fishing rod, so as to assist with aligning the feeding mechanism with the rod body during assembly.

Furthermore, the locking and line feeding element may have a plurality of locking lugs disposed about its exterior for interfacing with a set of corresponding grooves and securing it to the rear end of an interline fishing rod.

In further examples, the first end of the housing has formed therein a groove for receiving a corresponding protrusion on the second end of the body of the locking and line feeding element, thereby preventing rotation of the parts with respect to one another when coupled together. In such cases, the protrusion of the locking and line feeding element may have an opening formed therein for interfacing with an assembly tool.

Also provided herein are several design options for a telescopic interline fishing rod compatible for use with the feeding mechanism of the present disclosure.

The interline fishing rod may have an open-ended rear handle for interfacing with the locking and line feeding element described above, in which case the locking and line feeding element serves the dual purpose of also securing the telescopic elements of the rod stored inside the body in place.

The central or "tip" portion of the telescopic rod will have a channel for feeding the fishing line which runs the length of the rod body and which aligns with the channel of the locking and line feeding element when they are coupled together via the locking lugs.

The telescoping portions of the fishing rod may fit snugly together within the body when retracted to prevent unwanted extension. Furthermore, to this end, the ends of the telescopic portions which are distal to the feeding assembly may flare out, i.e. be thicker.

The interline telescopic fishing rod may have portions of its exterior configured to receive a detachable reel assembly.

A line feeding tool may also be provided alongside the interline fishing rod, the tool having a gripping portion, a long thin rod body, and a hooked or looped end for holding the fishing line. This tool may have an end of the fishing line threaded through, and can then be inserted through the central channel of the interline fishing rod, pulling the fishing line with it for a quick and easy set up.

BRIEF DESCRIPTION OF THE DRAWINGS

Various embodiments of the invention are disclosed in the following detailed description and accompanying drawings.

Figure 1:
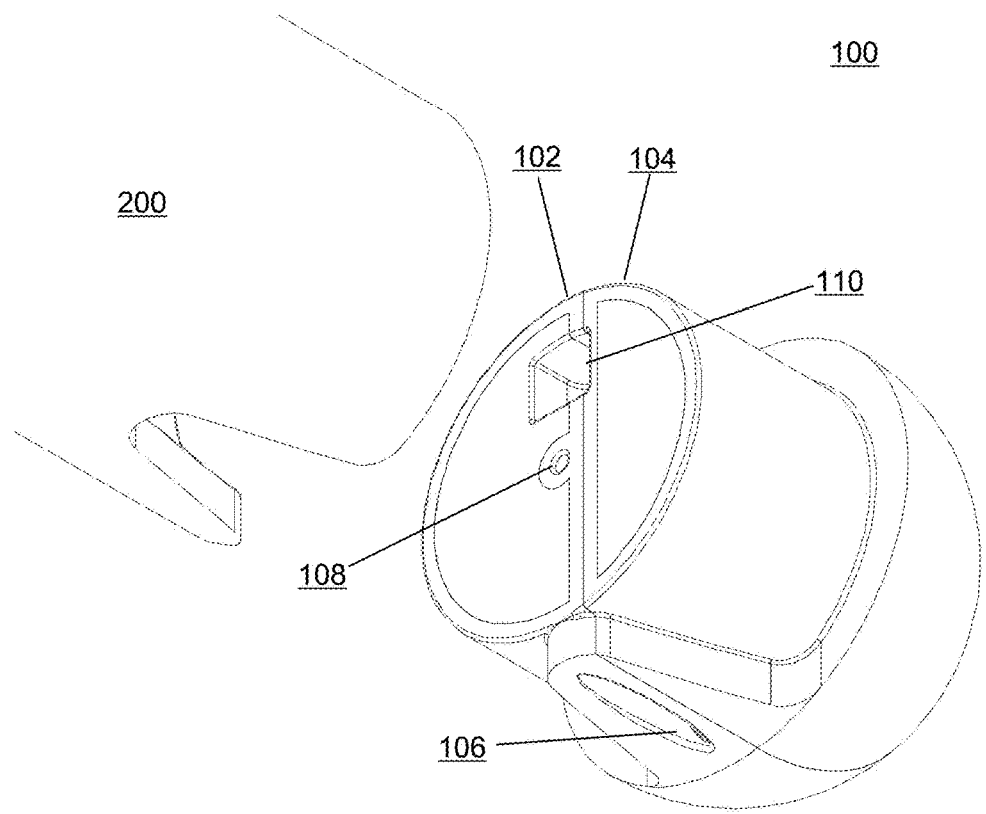
FIG. 1 illustrates an isometric view of an example configuration of a feeding mechanism for an interline fishing rod according to the present disclosure in the process of being coupled to the rear of a rod.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a," "an" and "the" are intended to include the plural forms as well, unless the context clearly indicates otherwise.

Spatially relative terms, such as "under," "below," "lower," "over," "upper" and the like, may be used herein for ease of description to describe one element or feature's relationship to another when the apparatus is right side up.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The present disclosure relates to a line feeding mechanism for an interline fishing rod which receives the fishing line from the reel in a reverse direction to conventional designs, threading the line through an opening in the housing at the back of the handle, around an internal pulley mechanism, and then forward through a channel which is aligned with the center of the rod body.

Various accessories and a suitable interline telescopic fishing rod design compatible with the feeding mechanism are also disclosed herein.

Referring to FIG. 1, an isometric view of an example configuration of a line feeding mechanism 100 according to the present disclosure is shown in the process of being coupled to the rear of a an interline telescopic rod 200.

As can be seen, the example mechanism 100 takes the form of a cylindrical housing shaped to couple to the rear end of the fishing rod handle, and in the present example the housing is modular in structure, with a female part 102 and a male part 104 forming two halves that fit together.

There is an opening 106 at the bottom of the housing exterior which is intended to receive fishing line from a reel attached to the fishing rod body 200, so the line runs in a direction from the reel towards the user when they hold the rod 200 and is threaded through opening 106 and into an internal chamber with a pulley system as described below, before coming out of opening 108 which is at the exact center of the cylindrical body and thus will be aligned with the center of the rod body 200 when coupled together.

Figure 2:
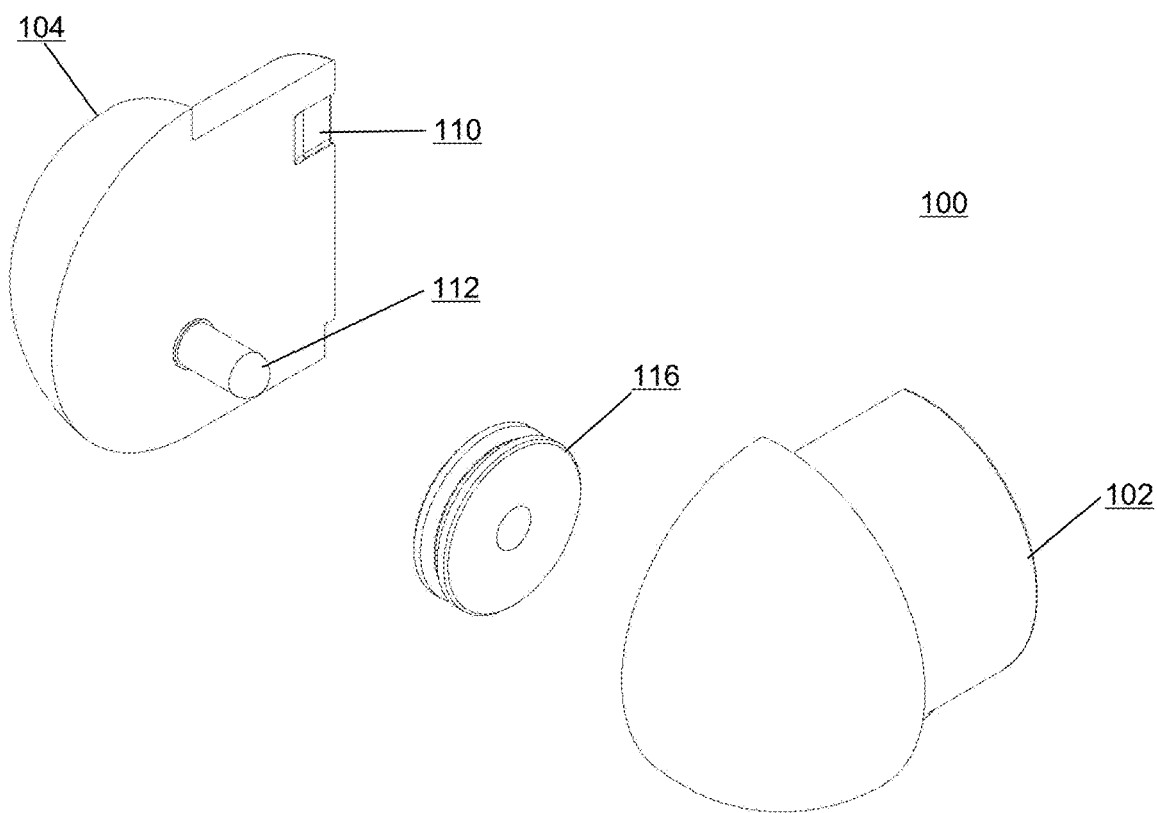
FIG. 2 illustrates a first exploded view of the modular components of the example feeding mechanism configuration.

Turning to FIG. 2, a first exploded view of the modular components of the example feeding mechanism 200 is shown. The aforementioned pulley 116 can be seen. It is a standard pulley wheel with a V-shaped groove running about its circumference on which the fishing line will be hooked.

The male 104 and female 102 parts sandwich the pulley wheel 116 between them when the pulley wheel is mounted to the shaft 112 of the male part and the two parts are coupled together. As can be seen from the later figures, the female part 102 has a corresponding opening 114 for receiving the shaft 112, and is shaped to form a chamber around the pulley wheel with sufficient clearance to allow it to rotate freely within.

The profiles of surfaces of the male and female parts in the example configuration are otherwise flat, and are coupled together using a pair of attracting magnets disposed within their respective housings. Since there are not other points of obstruction between them, the housing can be disassembled into the two parts by twisting the male part 104 with respect to the female part 102 about the axis of rotation of the shaft 112. This disengages the magnets and allows the two parts to be pulled apart.

Figure 3:
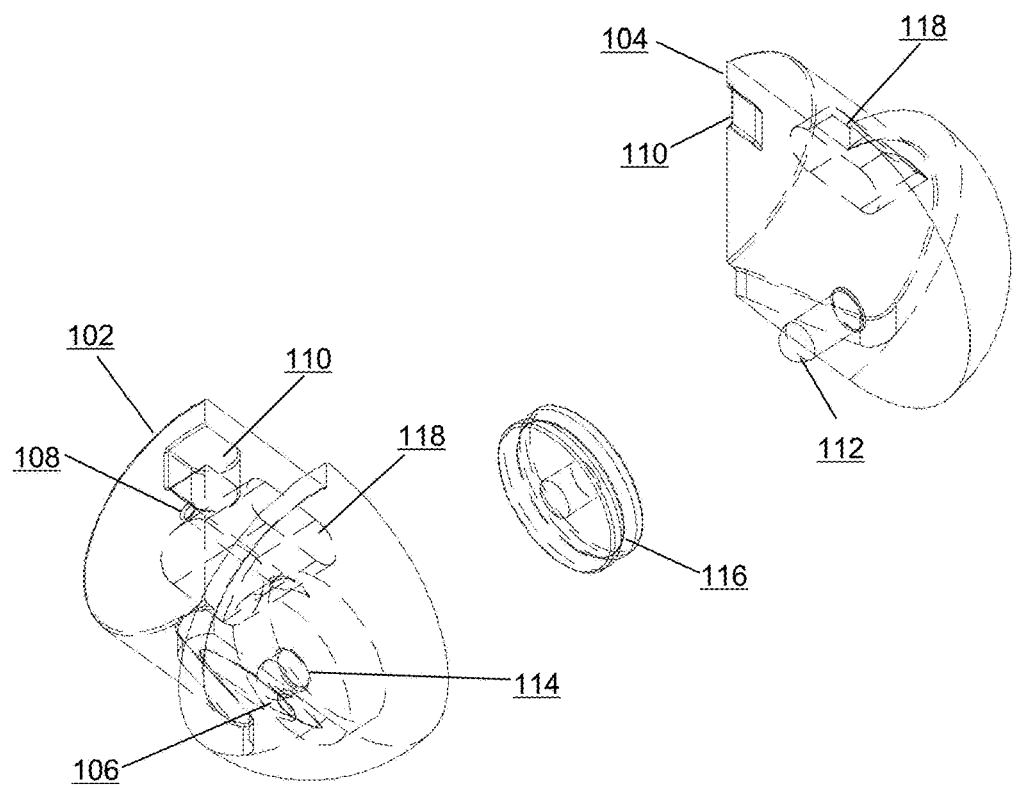
FIG. 3 illustrates a second exploded view of the modular components with the exterior portions rendered transparent to show the internal structure.

Turning to FIG. 3, a second exploded view of the modular components of the feeding mechanism is shown with the exterior portions rendered transparent to show the internal structure—specifically the magnets 118, which may be held in place within the housings via carbon fiber inserts, for example.

FIG. 3 also demonstrates how the channel from opening 106 leads into the pulley chamber of the female part 102, which in turn leads to the centrally aligned channel and opening 108.

Figure 4:
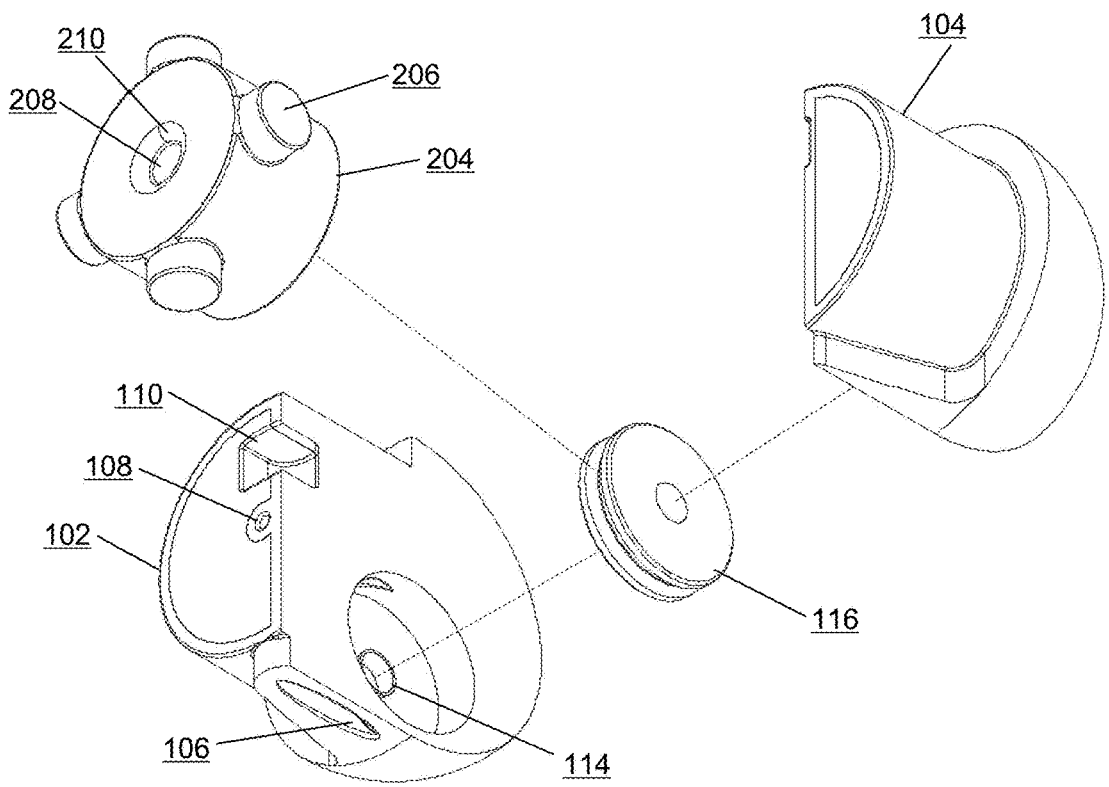
FIG. 4 illustrates a third exploded view of the example feeding mechanism configuration with the inclusion of an example configuration of a locking and line feeding element.

Referring to FIG. 4, a locking and line feeding element 204 may also be included in the mechanism to held align the housing components with the rod body and secure them together. The placement and alignment of this element 204 is shown in another exploded view.

As can be seen, the locking element 204 also has a cylindrical body, with a central channel running through it that results in another opening 208. This opening 208 is surrounded by an indented portion 210 which can help specific types of interline fishing rod with aligning their own fishing line channels.

The "locking" part of element 204 refers to the locking lugs 206 on its exterior which can interface with corresponding groove sand indentations on the rear of an interline fishing rod to secure the whole line feeding mechanism in place.

The locking element 204 also has on its opposing side a protrusion that interfaces with a set of grooves 110 on the male and female parts of the housing, preventing rotation between the two and coupling them together.

Figure 5:
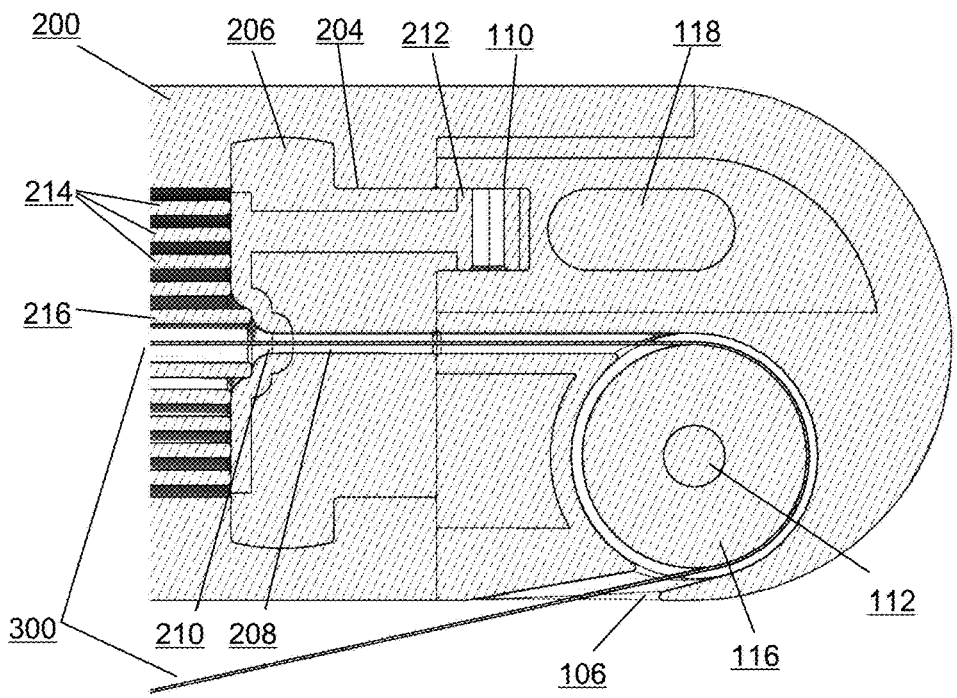
FIG. 5 illustrates a first cross-sectional view of the example feeding mechanism configuration installed at the rear of a compatible telescopic interline fishing rod.

Referring to FIG. 5, a cross-sectional view is shown of the example feeding mechanism 100 and locking element 204 installed at the rear of a compatible telescopic interline fishing rod 200. The protrusion 212 of the locking element, which has an opening in it for interfacing with an installation tool as described below, can be seen fit snugly in the indent 110 of the feeding mechanism.

The central telescopic portion 216 of the fishing rod 200 that forms the tip of the rod and which has a fishing line 300 running through its center from the line feeding mechanism 100, is shown in a retracted position resting inside the guiding indent 210 of the locking element 204. The other telescopic portions 214 are arranged concentrically around the tip portion 216 within the rod body 200.

The line 300 is coming backwards from a reel installed on the rod body exterior, passing through opening 106, and being fed around pulley wheel 116 and out of opening 108 into the channel of the locking element 204.

Figure 6:
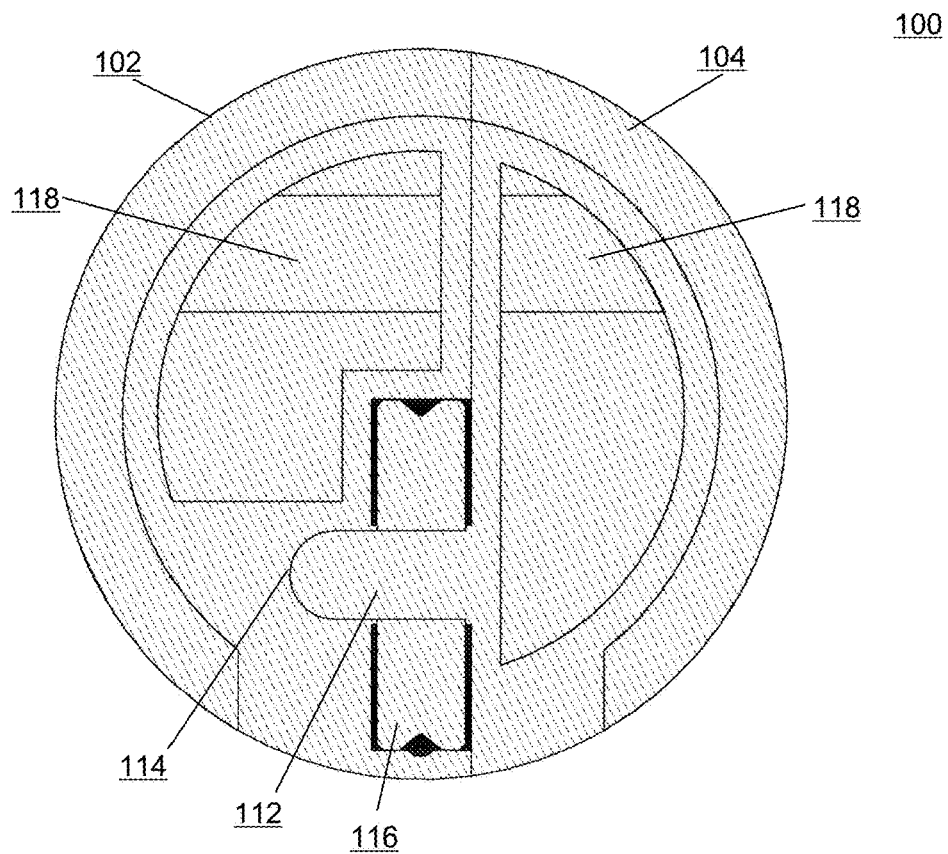
FIG. 6 illustrates a second cross-sectional view of the body of the example feeding mechanism configuration.

FIG. 6 illustrates a cross-sectional view of the body of the example feeding mechanism configuration 100, providing a representation of how the internal elements such as the magnets 118, the shaft 112 and the pulley wheel 116 are positioned when the male part 104 and female part 102 are assembled together. As can be seen the pulley wheel 116 has clearance on either side but is fit snugly in the chamber above and below it so that the line 300 cannot escape or become tangled.

Figure 7:
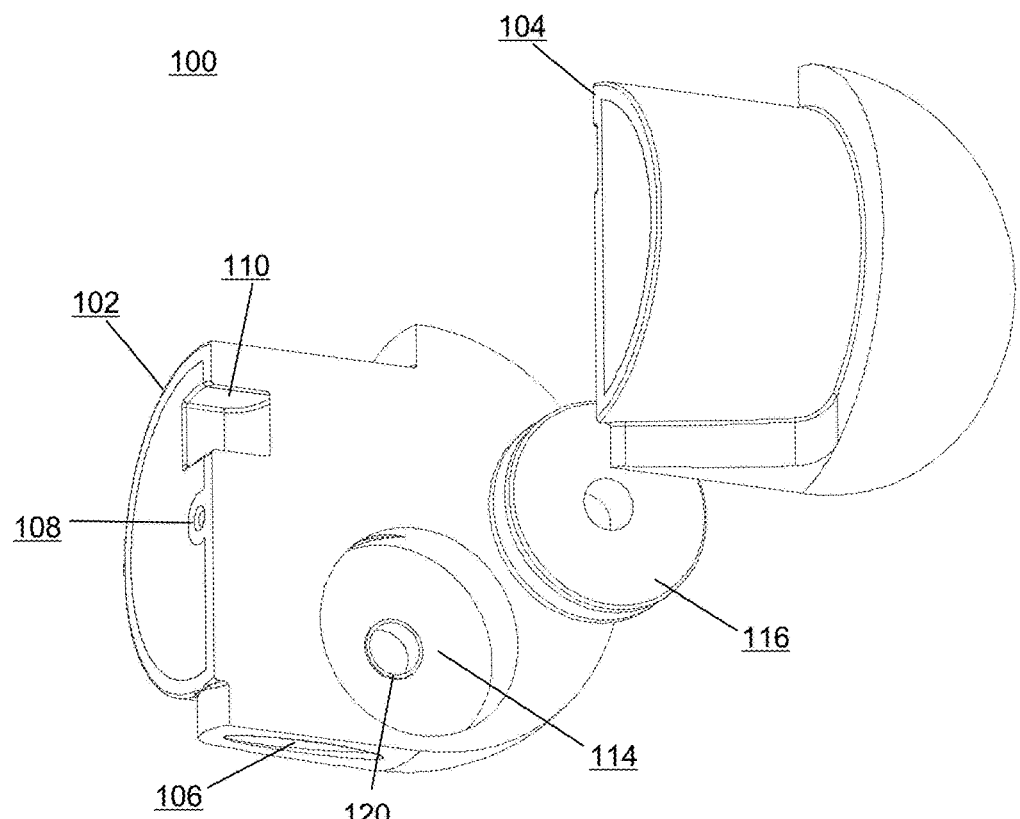
FIG. 7 illustrates a fourth exploded view of the example feeding mechanism configuration with a more detailed illustration of the female part.

The clearance either side of the pulley wheel helps ensure it can rotate freely with minimal friction, and is caused by a small ridged lip 120 positioned both about the opening 114 of the female part and the base of the shaft 112 on the male part, as can be seen in FIG. 7.

Figure 8:
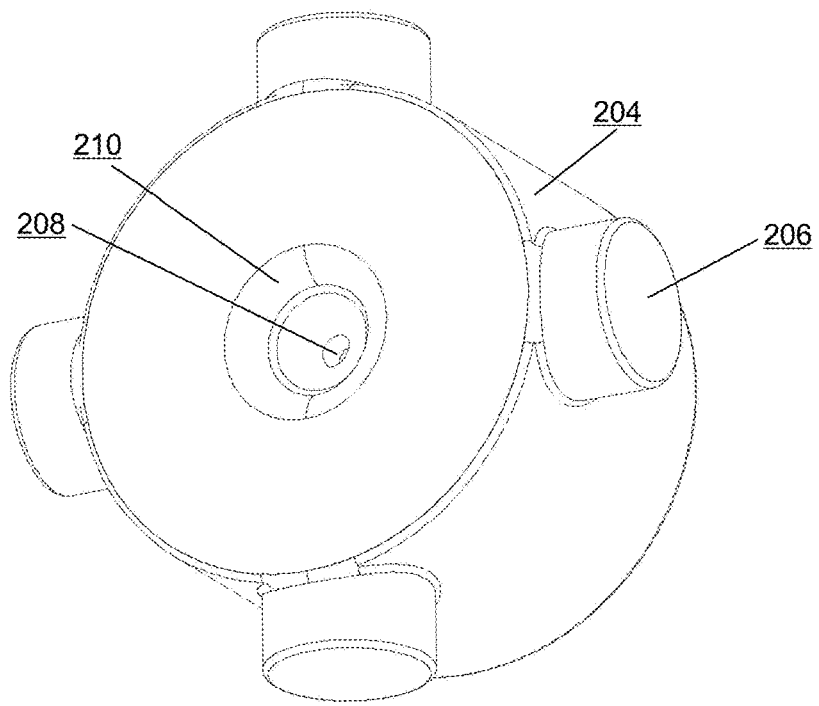
FIG. 8 illustrates an isometric view of the locking and line feeding element in isolation.

FIG. 8 shows a closer view of the locking and line feeding element 204 in isolation, with the side having the guiding indent 210 facing forwards.

Figure 9:
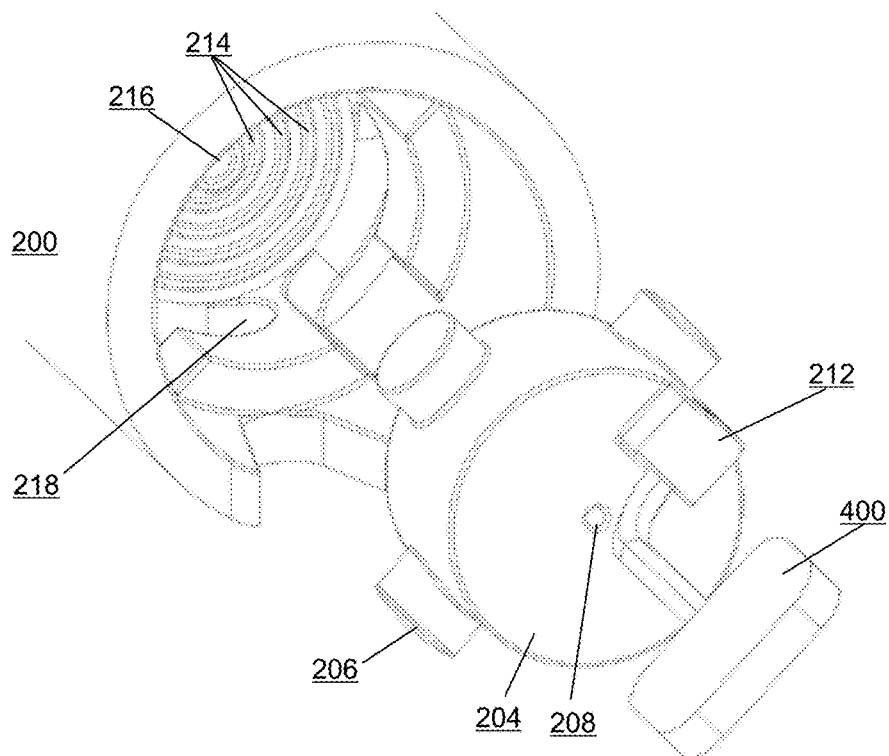
FIG. 9 illustrates an isometric view of an assembly tool being used to install the locking and line feeding element at the rear of a telescopic interline fishing rod.

In FIG. 9 the locking element 204 is shown facing away as it is aligned to be installed in the rear of the fishing rod body 200. When it is placed inside the concave area at the rear of the fishing rod the locking lugs 206 of the element 204 will interlock with the grooves 218 shown, and when it is twisted, through the help of the assembly tool 400 which couples to the opening in protrusion 212 at the rear of the locking element 204, it will become locked in place.

Figure 10:
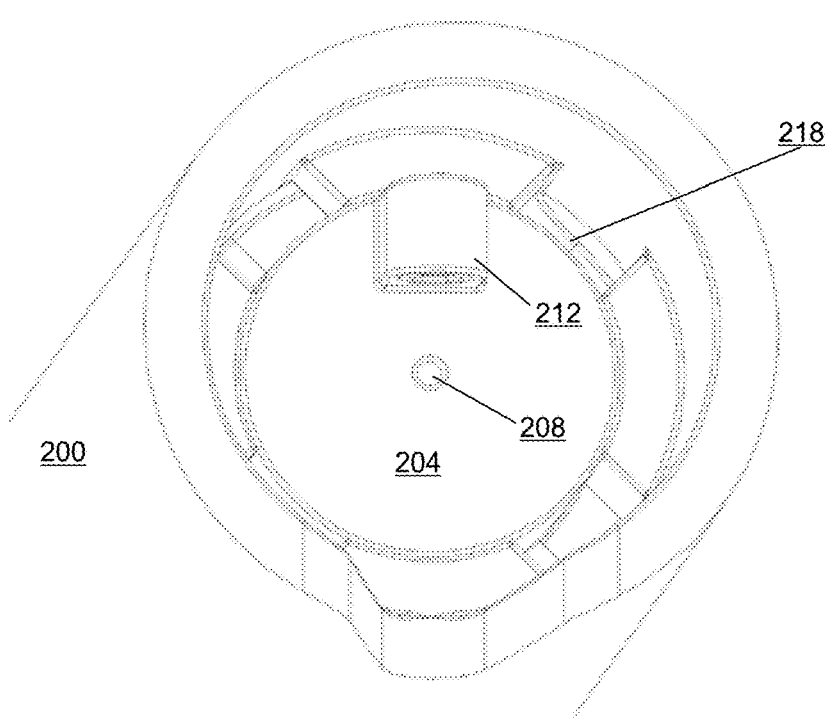
FIG. 10 illustrates an isometric view of the locking and line feeding element installed at the rear of the telescopic interline fishing rod.

This secure configuration of the locking element 204 serves the purposes of providing an interface between the rod body 200 and the line feeding mechanism 100, keeping the telescopic portions 214 and 216 of the rod from falling backwards, and aligning the line feeding channels with the central channel of the telescopic tip 216. In FIG. 10 the locking element is shown secured in place.

Figure 11:
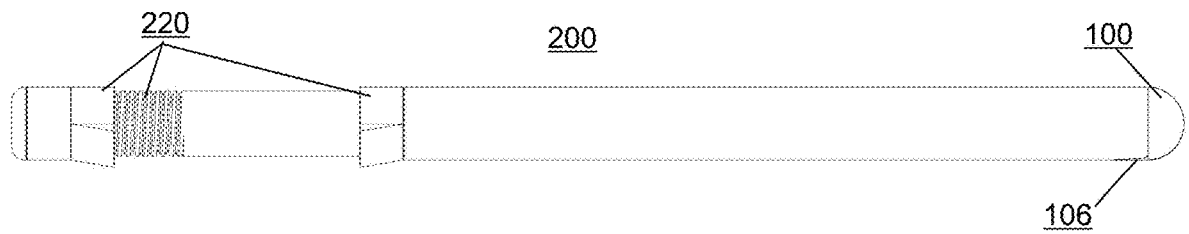
FIG. 11 illustrates a side view of an example interline fishing rod compatible with the feeding mechanism of the present disclosure in a retracted state.

FIG. 11 shows a side view of the interline fishing rod 200 in a retracted state. As can be seen, the line feeding mechanism 100 is installed at the rear end of the handle, with the opening 106 on the exterior for receiving a fishing line.

The rod body also has a threaded portion 220 for installation of a detachable reel, as is standard among many modern fishing rods.

Figure 12:
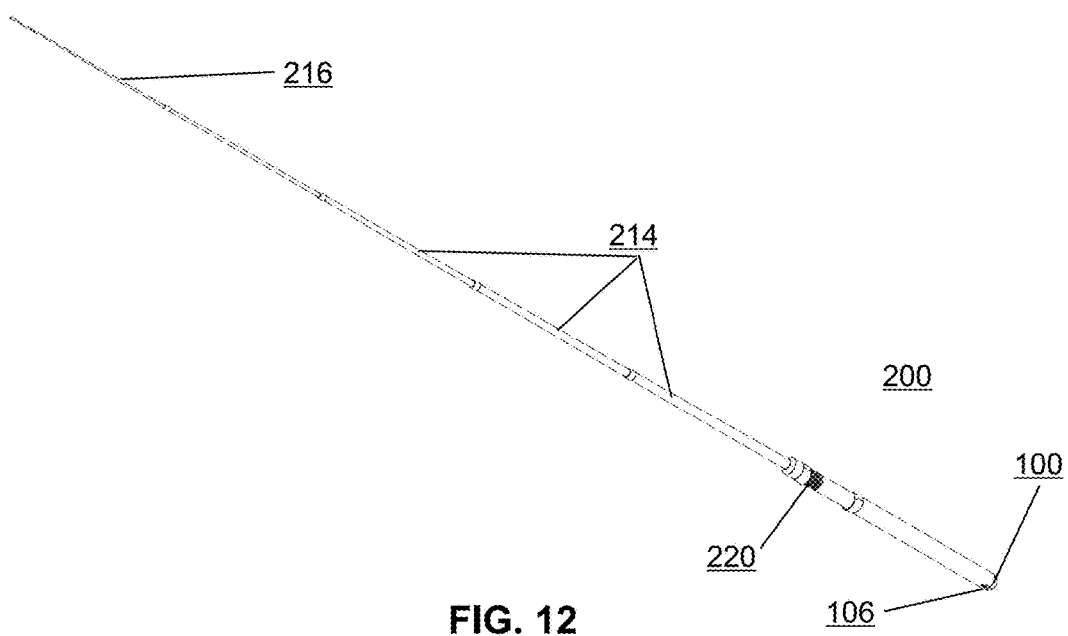
FIG. 12 illustrates an isometric view of the example interline fishing rod in an extended state.

FIG. 12 shows the example interline fishing rod 200 in an extended state.

Figure 13:
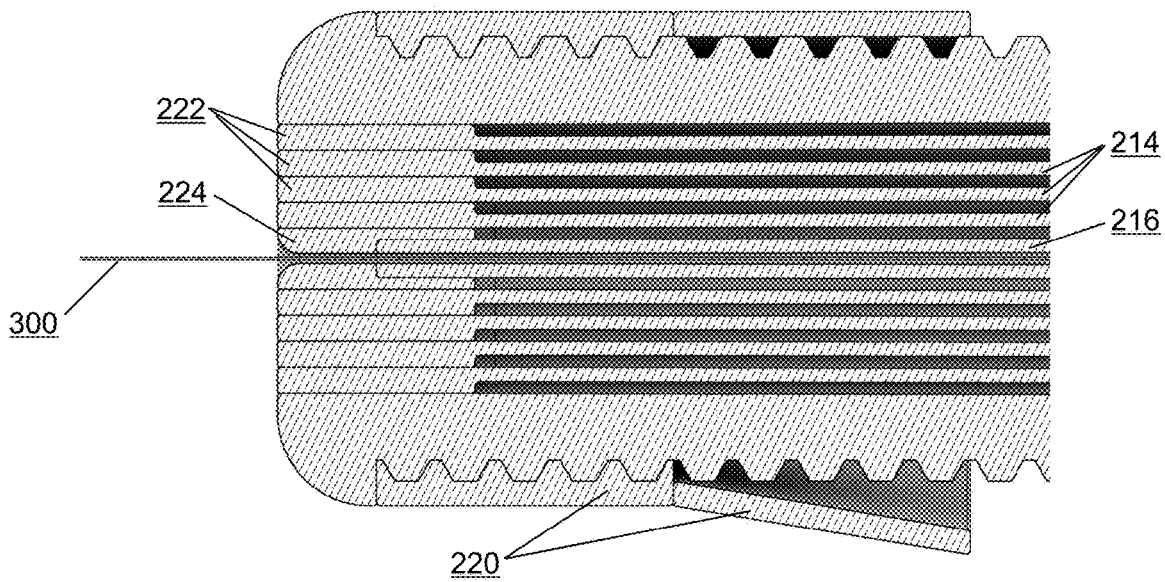
FIG. 13 illustrates a cross-sectional view of the tip of the interline fishing rod in a retracted state.

FIG. 13 shows a cross-sectional view of the tip of the interline fishing rod 200 when in a retracted state. This highlights a novel feature of the telescopic fishing rod design, where the end points 222 of the telescopic portions 214 are thicker than the rest of their length, they "flare" out. This causes a bunching effect and increased friction between them when fully retracted as shown, and reduces the risk of unintended extension. The central tip 222 of the central telescopic portion 216 is also flared, and may be made of a separate piece with a coating for improved durability.

Figure 14:
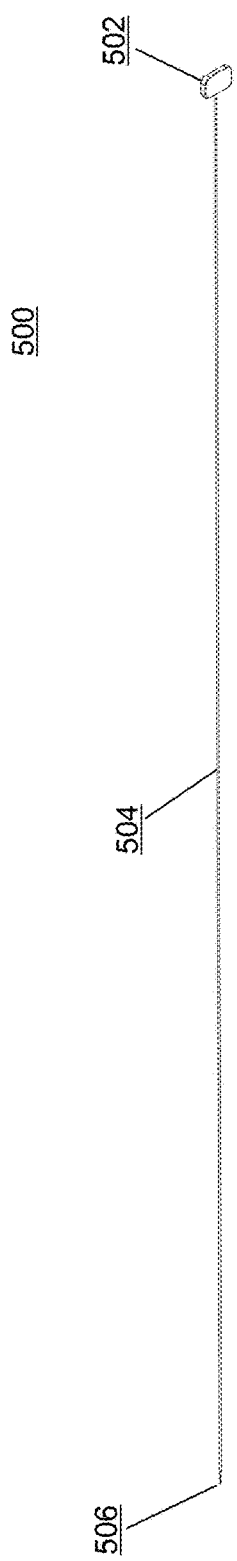
FIG. 14 illustrates an isometric view of an example line feeding tool for use with the disclosed interline fishing rod and feeding mechanism.

The configuration of the disclose telescopic interline fishing rod design and the line feeding mechanism lend themselves to quick and convenient setup of the rod, which can be further assisted by a line installation tool 500, as shown in FIG. 14.

As can be seen, the tool has a long thin body 504 that is smaller in diameter than the central channel of the interline fishing rod 200, and which has a gripping portion 502 at one end for a user to hold, and a hooked or looped end 506 on the opposite side through which fishing line can be threaded.

Figure 15:
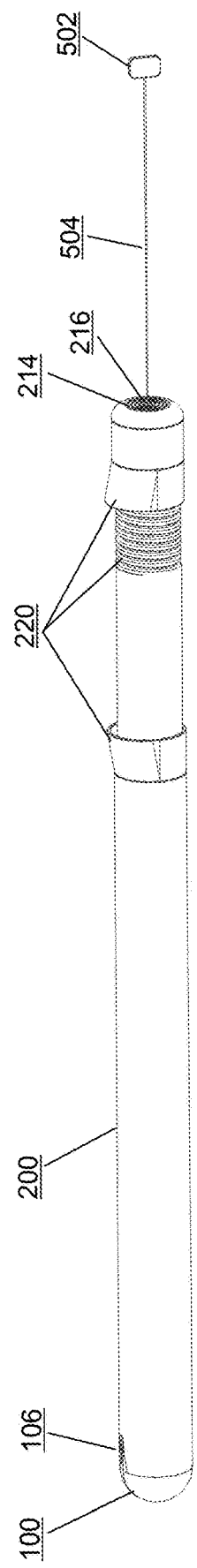
FIG. 15 illustrates an isometric view of the line feeding tool in use installing fishing line for the interline fishing rod and feeding mechanism.

The tool is then inserted into the central channel of the interline fishing rod 200 as shown in FIG. 15, allowing the fishing line to be threaded all the way through and into the line feeding mechanism 100.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the line feeding mechanism and related apparatus have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A feeding mechanism for an interline fishing rod, the feeding mechanism comprising: a housing having a first end configured to couple to the rear end of an interline fishing rod, the first end having a first opening leading into a first tunnel, the first opening being positioned on the first end such that when the housing is coupled to a fishing rod, the opening aligns with the central axis of the rod body which aligns with the direction of the first tunnel; and a freely rotatable pulley, disposed within the housing, a wheel of the pulley having a V-shaped groove for guiding a fishing line running abouts its edge, the pulley wheel being constrained to rotate about a shaft within the housing such that the axis of rotation of the pulley wheel is orthogonal to the direction of the first tunnel; wherein the housing has a second opening formed on its exterior configured to receive a fishing line from a reel, with a second channel leading from the second opening in a direction away from the first end and towards an opposing second end of the housing and into a chamber containing the pulley; wherein the housing is modular, comprising a male part with a shaft for the pulley wheel and a female part that couples to the male part and has a corresponding opening for receiving the end of the shaft.

2. A feeding mechanism for an interline fishing rod according to claim 1, wherein the base of the shaft of the male part and the opening of the female part each comprise a ridged lip for constraining the lateral movement of the pulley wheel along the shaft.

3. A feeding mechanism for an interline fishing rod according to claim 1, wherein the male part and the female part each comprise an integrated magnet in their interiors, positioned such that the magnets exert an attract force between the two parts when assembled.

4. A feeding mechanism for an interline fishing rod according to claim 2, wherein the interfacing surfaces of the male part and the female part are flat aside from the pulley chamber and shaft, allowing the male part to be rotated with respect to the female part about the shaft axis when the feeding mechanism is not coupled to the fishing rod.

5. A feeding mechanism for an interline fishing rod, the feeding mechanism comprising: a housing having a first end configured to couple to the rear end of an interline fishing rod, the first end having a first opening leading into a first tunnel, the first opening being positioned on the first end such that when the housing is coupled to a fishing rod, the opening aligns with the central axis of the rod body which aligns with the direction of the first tunnel; and a freely rotatable pulley, disposed within the housing, a wheel of the pulley having a V-shaped groove for guiding a fishing line running abouts its edge, the pulley wheel being constrained to rotate about a shaft within the housing such that the axis of rotation of the pulley wheel is orthogonal to the direction of the first tunnel; wherein the housing has a second opening formed on its exterior configured to receive a fishing line from a reel, with a second channel leading from the second opening in a direction away from the first end and towards an opposing second end of the housing and into a chamber containing the pulley; wherein the mechanism further comprises a locking and line feeding element configured to secure the first end of the housing to the rear of an interline fishing rod, the element having a cylindrical body with a first end and a second end and a central channel running through its length for feeding line from the first end of the housing to the fishing rod.

6. A feeding mechanism for an interline fishing rod according to claim 5, wherein first end of the cylindrical body of the locking and line feeding element has a guiding indent surrounding the opening of the central channel for receiving a central tip of a telescoping interline fishing rod, so as to assist with aligning the feeding mechanism with the rod body during assembly.

7. A feeding mechanism for an interline fishing rod according to claim 5, wherein the locking and line feeding element has a plurality of locking lugs disposed about its exterior for interfacing with a set of corresponding grooves and securing it to the rear end of an interline fishing rod.

8. A feeding mechanism for an interline fishing rod according to claim 5, wherein the first end of the housing has formed therein a groove for receiving a corresponding protrusion on the second end of the body of the locking and line feeding element, thereby preventing rotation of the parts with respect to one another when coupled together.

9. A feeding mechanism for an interline fishing rod according to claim 8, wherein the protrusion of the locking and line feeding element has an opening formed therein for interfacing with an assembly tool.

* * * * *